Oct. 12, 1926.
T. J. FREEMAN
CAMERA
Filed April 29, 1922   9 Sheets-Sheet 1
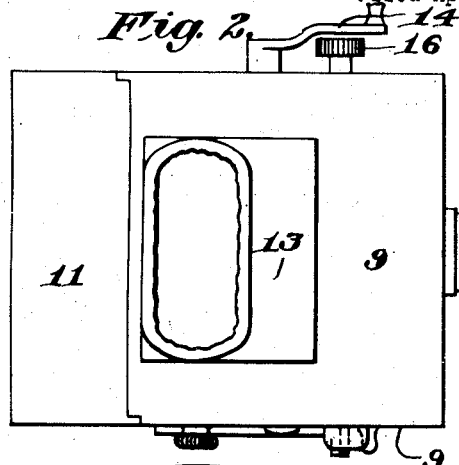
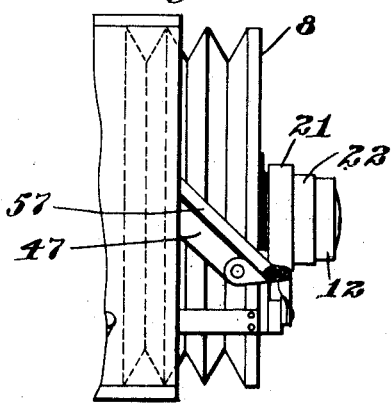
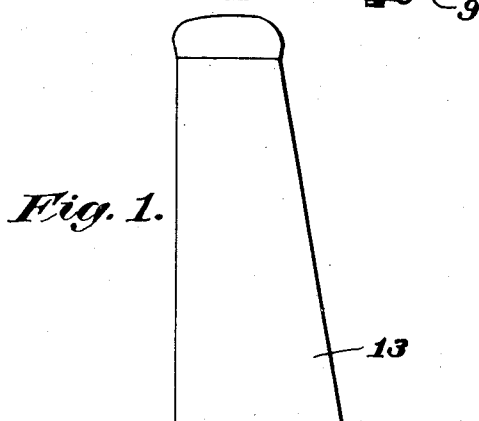
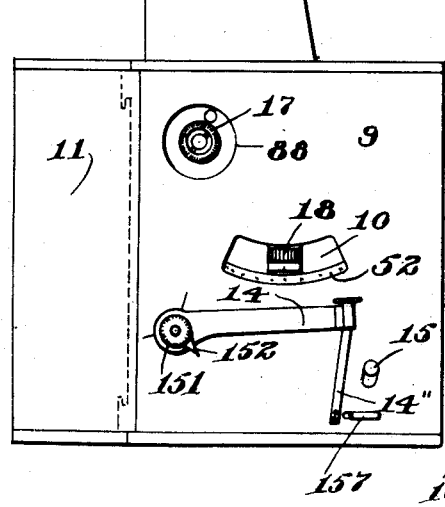
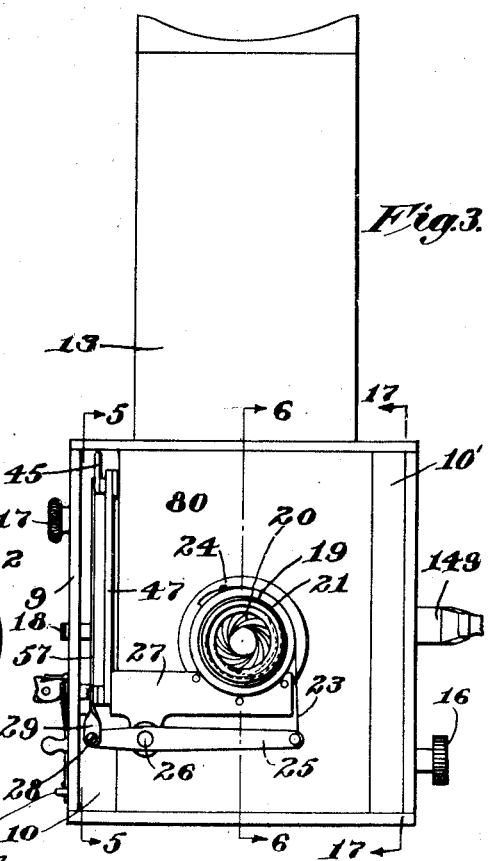
Inventor
Thomas J. Freeman
By Mitchell, Chadwick & Kent
Attorneys

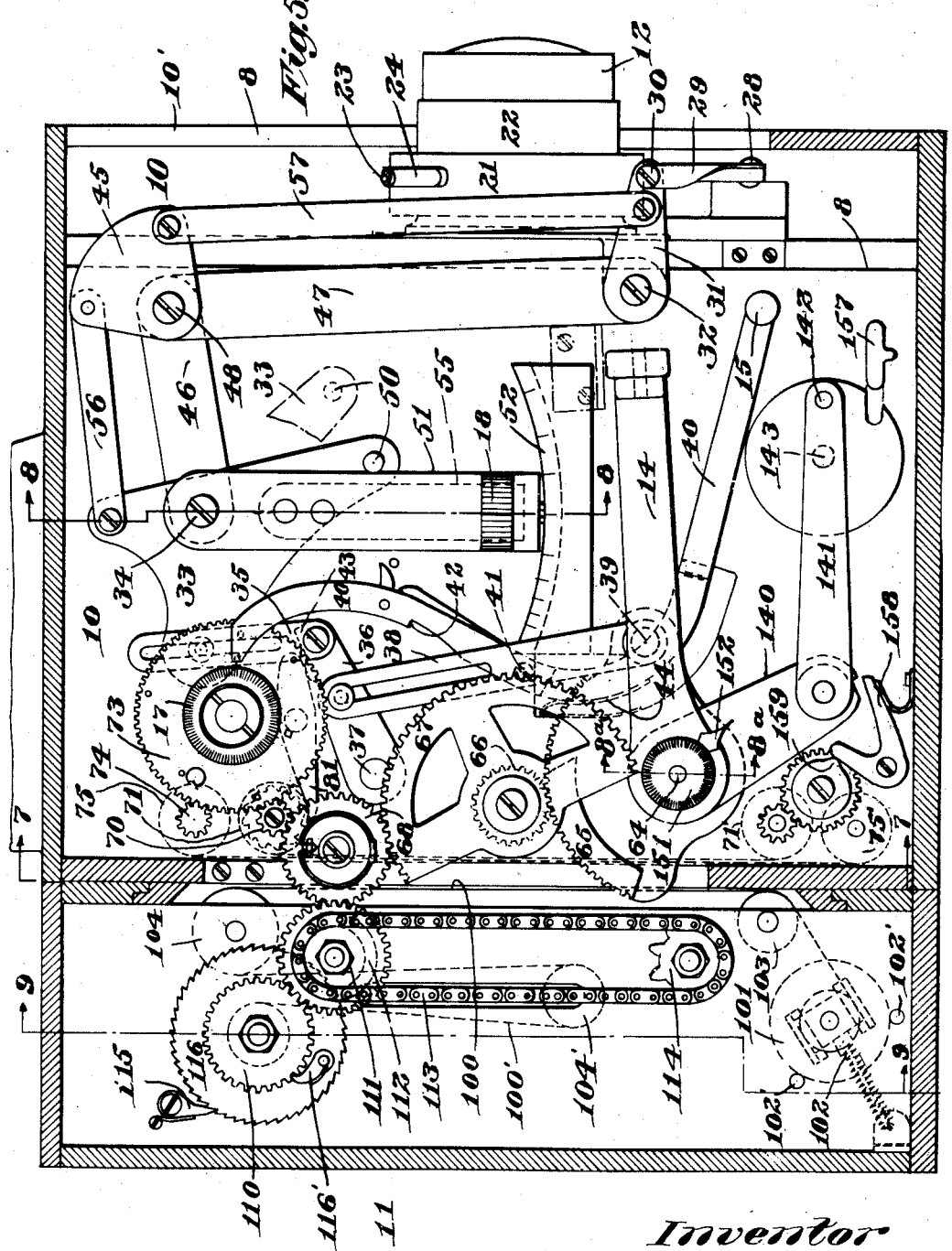

Oct. 12, 1926.
T. J. FREEMAN
1,602,483
CAMERA
Filed April 29, 1922    9 Sheets-Sheet 3
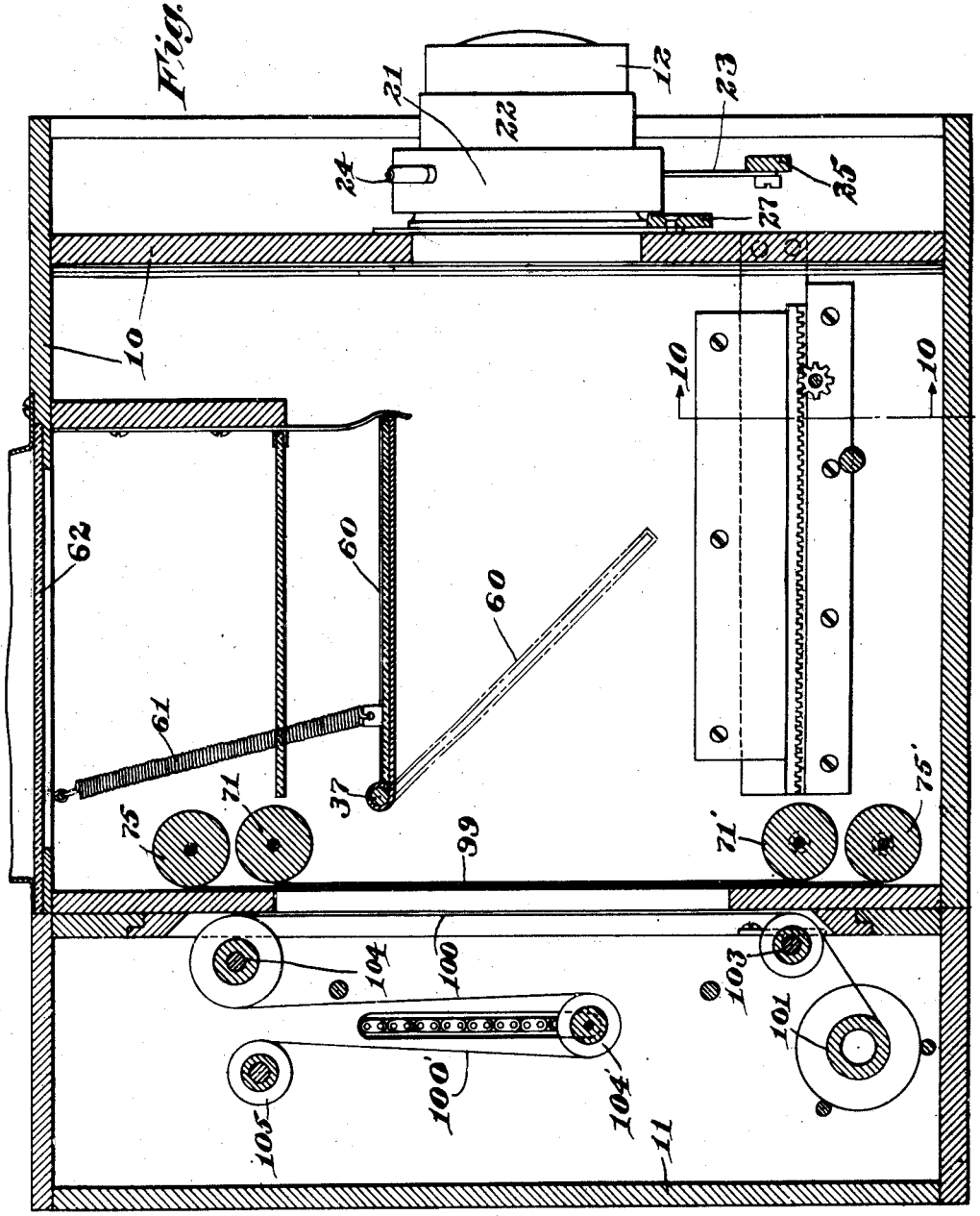
Inventor
Thomas J. Freeman
By Mitchell, Chadwick & Kent
Attorneys Oct. 12, 1926.

T. J. FREEMAN

CAMERA

Filed April 29, 1922  9 Sheets-Sheet 4

1,602,483

Inventor
Thomas J. Freeman
By Mitchell, Chadwick & Kent
Attorneys

Oct. 12, 1926.
T. J. FREEMAN
CAMERA
Filed April 29, 1922     9 Sheets-Sheet 5
1,602,483
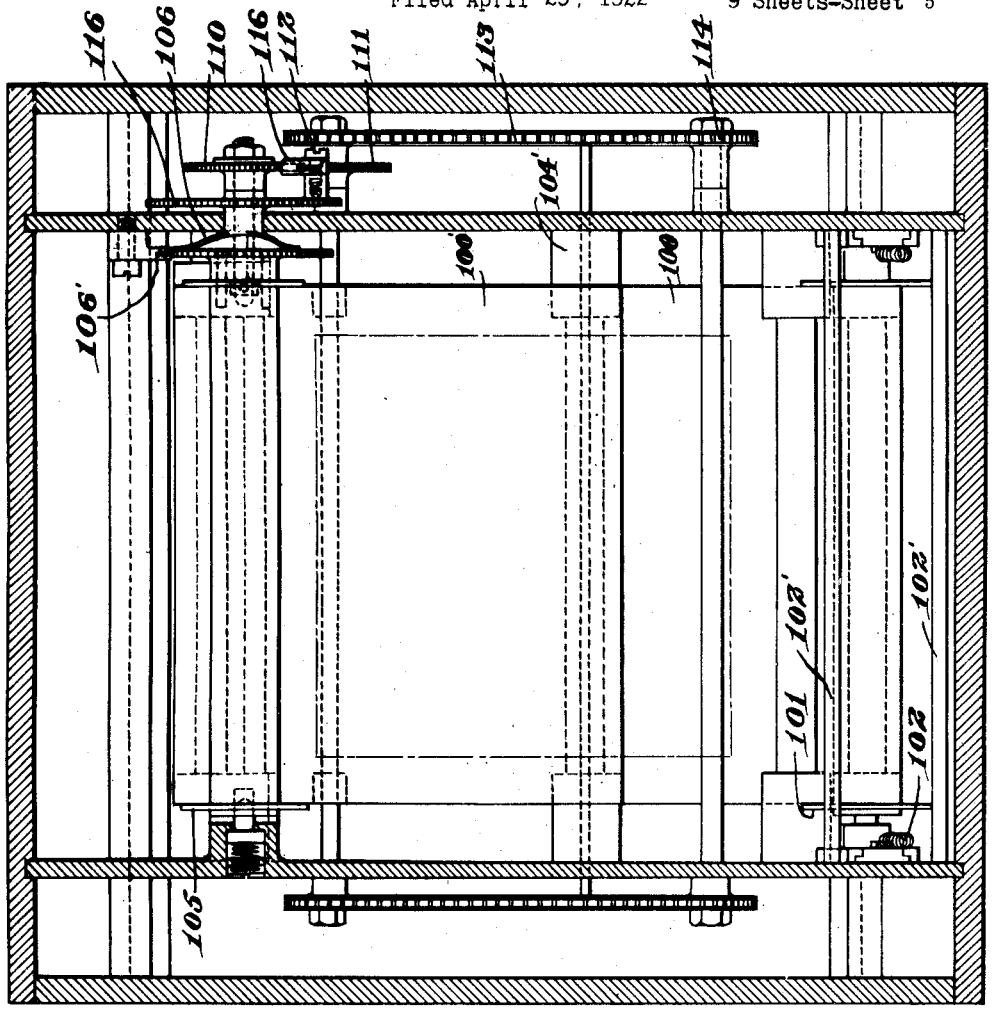
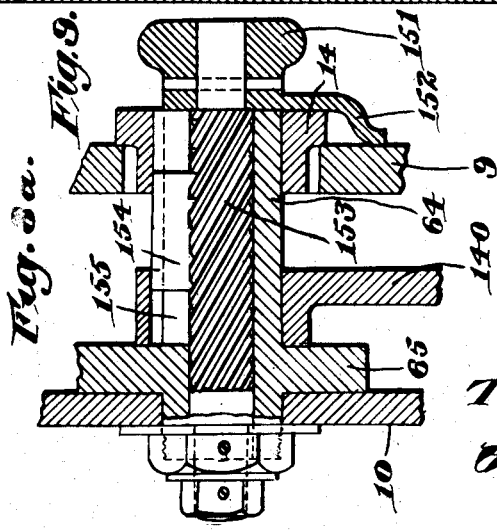
Inventor
Thomas J. Freeman
By Mitchell, Chadwick & Kent
Attorneys Oct. 12, 1926.

T. J. FREEMAN

CAMERA

Filed April 29, 1922　　9 Sheets-Sheet 6

1,602,483

Inventor
Thomas J. Freeman
by Mitchell, Chadwick & Kent
Attorneys

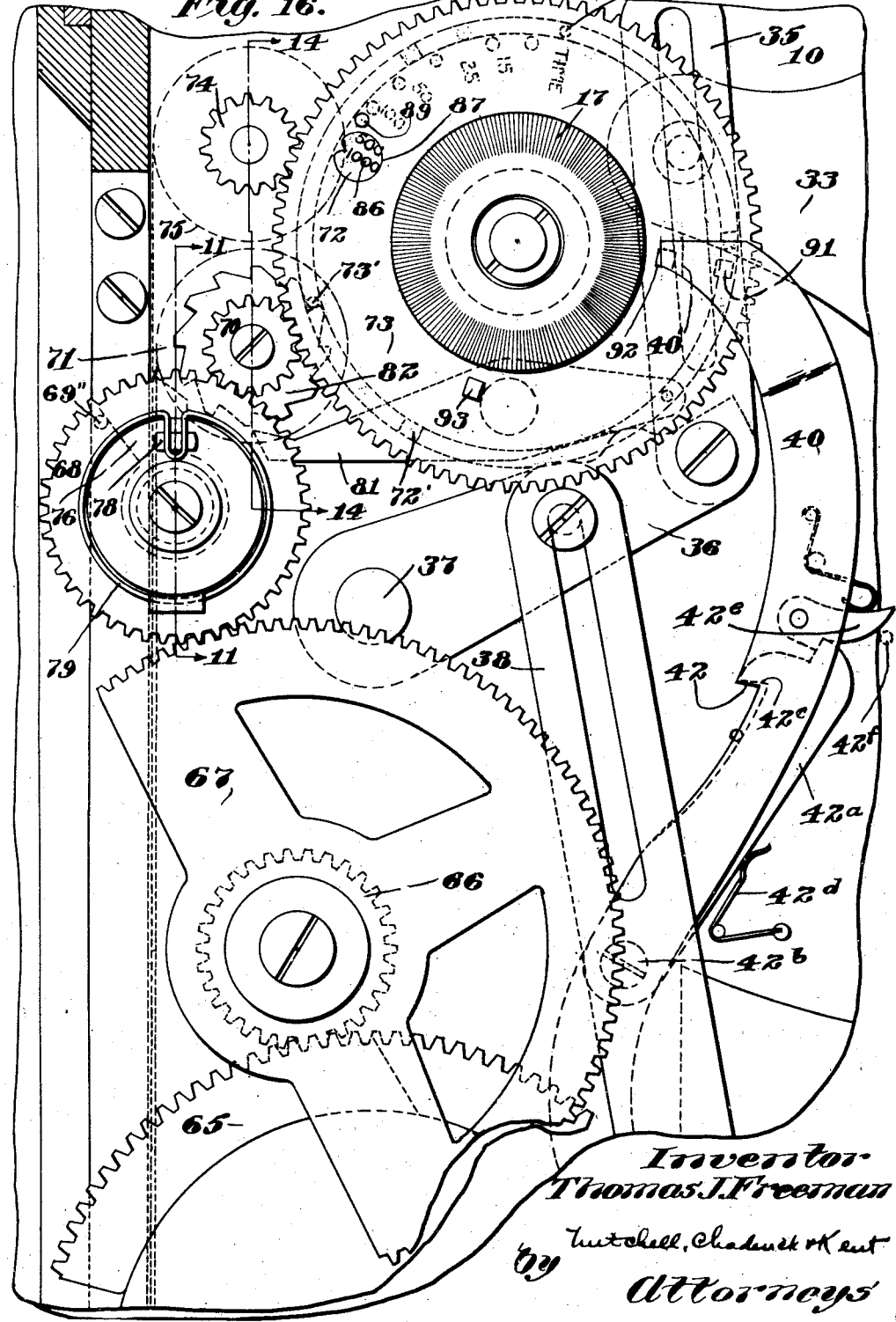

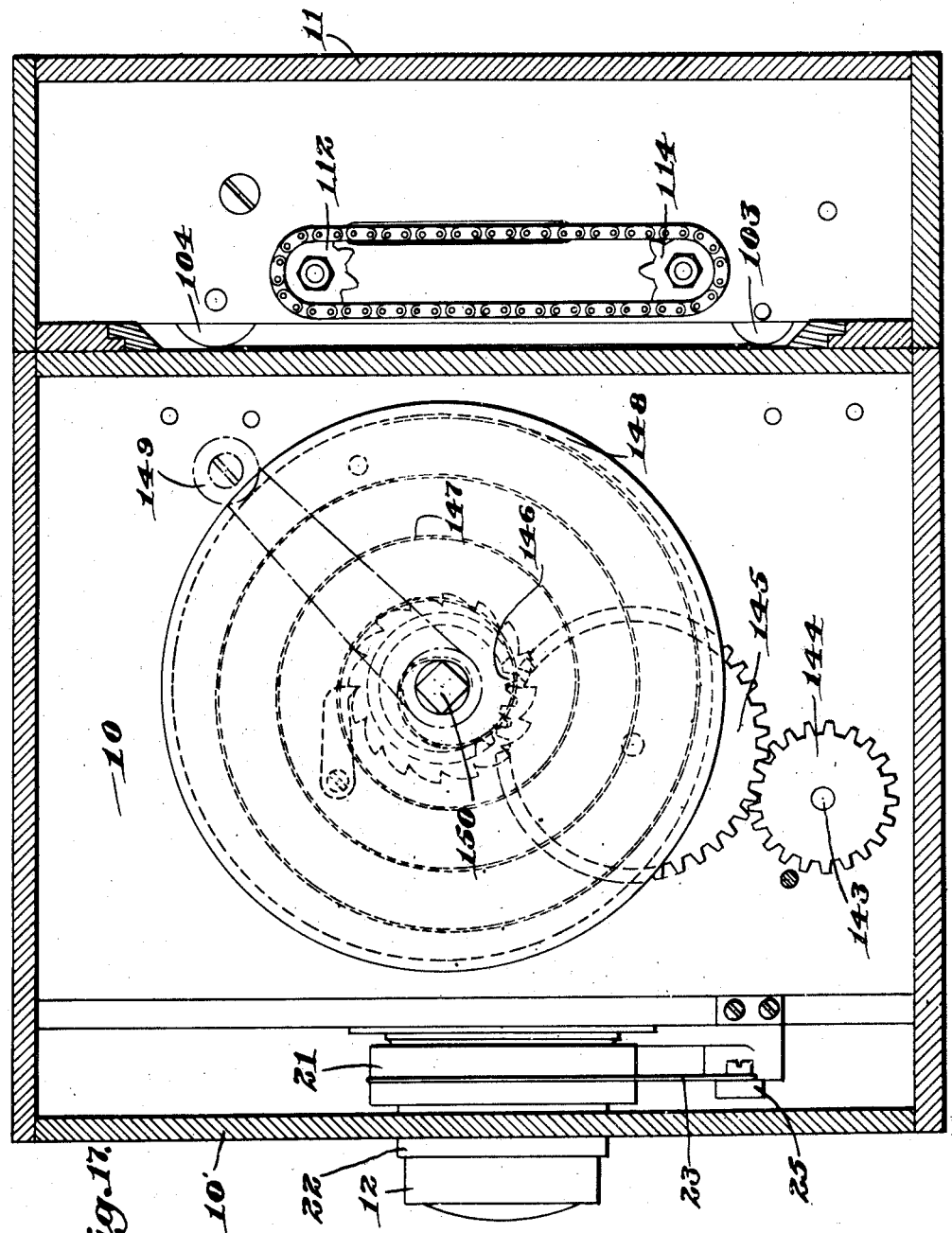

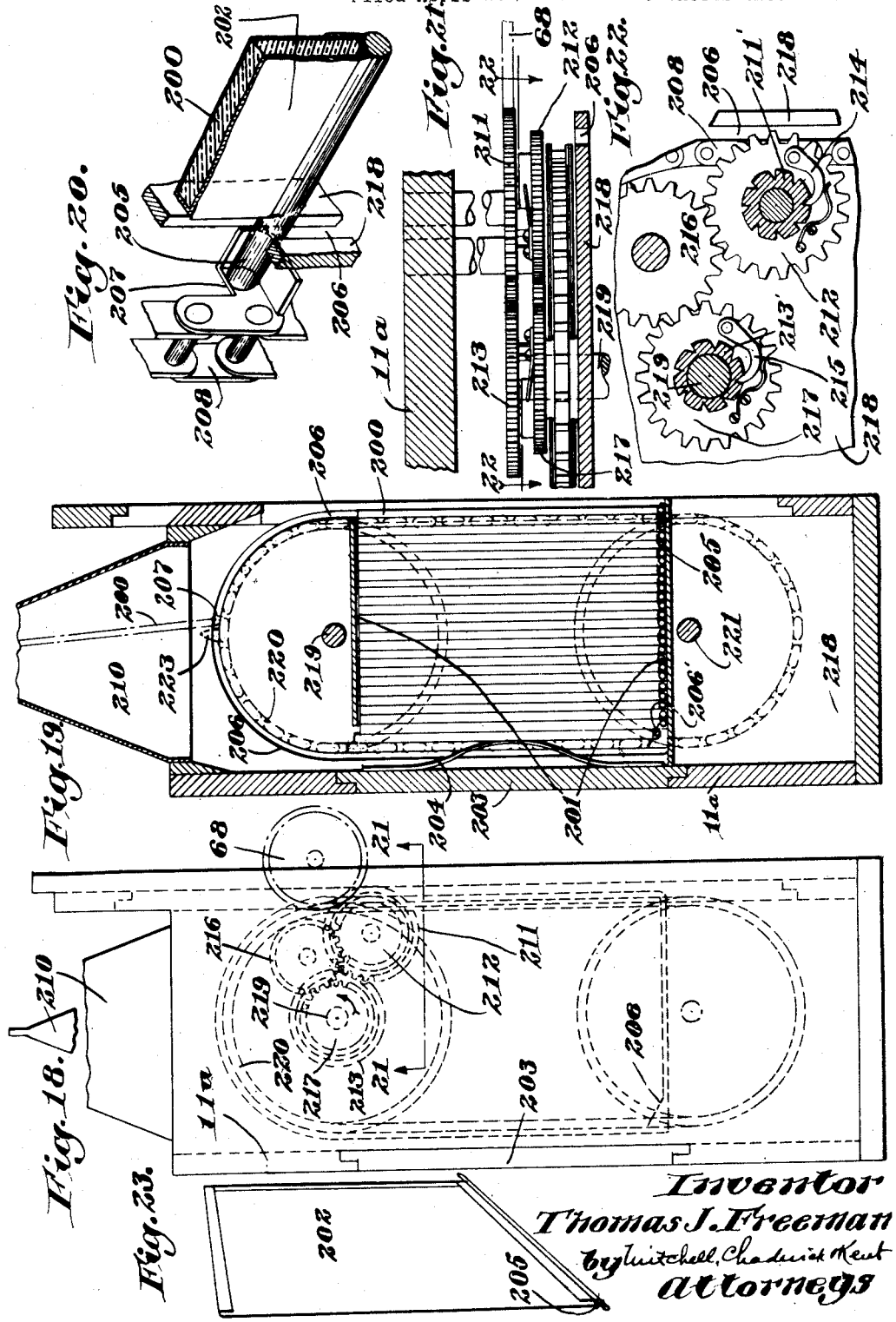

Patented Oct. 12, 1926.

1,602,483

UNITED STATES PATENT OFFICE.

THOMAS J. FREEMAN, OF BOSTON, MASSACHUSETTS.

CAMERA.

Application filed April 29, 1922. Serial No. 557,357.

This invention relates to improvements in cameras. More particularly it relates to the so-called reflex cameras, in which a mirror, arranged between the lens and the sensitive film, throws the image upon a ground glass screen in the top of the camera. The use of such cameras for rapid motion work makes it desirable that the operator be able to hold the diaphragm open to its widest extent until the moment of exposure; and to make a second and other exposures in rapid succession. It is an aim of the invention to provide means by which such a camera is made automatic in action, so that the operator has only to release a single latch, whereupon the camera will diminish the full diaphragm opening to any predetermined degree, simultaneously will swing the mirror out of line, and then will make the exposure. It is a further feature that by the simple swing of a lever, executed by the same hand and without his changing position or even taking his eyes from the ground glass screen, the operator can supply power by which the mechanism of the camera immediately moves the exposed film, whether mounted on flexible film or glass plate, along to safe position; installs fresh film or plate; resets the mirror; resets the shutter; and opens the diaphragm so that the operator can at once make another exposure. It is a further feature that these last mentioned operations can be initiated and executed automatically immediately after exposure, in which case the camera may be considered completely automatic. Other objects are to provide, in such a camera, for the easy changing of the diaphragm opening and the shutter opening which will be used in the automatic action. As regards the simultaneous setting of diaphragm and mirror in position for the exposure, it is an object to effect what may be an important saving of a brief interval of time between the operator's will to make exposure and the actual occurrence of the exposure, accompanied by less jarring of the camera and by less need for the operator to shift his position, than where these operations have required two successive actions by the operator. It is also an object to make the camera so that it cannot be mismanaged, as by the operator holding the release button down long enough to cause a second exposure unintentionally.

Another object is to couple the possibility of hand power operation with the preferred spring power or completely automatic style of operation, so that if the spring should be too much run down, or friction should be abnormally high, the operator can supplement the spring power by hand power. It is another aim to provide a camera which, while having the described automatic features, does not necessarily sacrifice the utilities of ordinary cameras in order to obtain them, but can, for example, be used for time exposures, or used without the mirror. And it may be stated generally that the invention aims to attain, in a hand camera of general utility, a notable result in the direction of simplifying the operation of such cameras by controlling it all through a single release, with the addition if desired of a single lever.

These objects, and others incidental to them, are accomplished by the provision of an interlocking arrangement of mechanism, the principle of which will be understood from a study of the detailed description of one type of apparatus embodying the invention, which follows. It will be obvious that variations may be made in sundry respects without departing from the scope of the invention and within the scope of the appended claims, and also that certain parts of the mechanism disclosed may be used with advantage, if desired, with omission of others. It is intended that the patent shall cover, by suitable expression in the appended claims, whatever features of patentable novelty exist in the invention disclosed.

In the accompanying drawings,

Figure 1 is a side elevation of a camera embodying the invention;

Figure 2 is a plan of the same;

Figure 3 is a front elevation of the same;

Figure 4 is a side elevation of the forward end of the same with lens projecting as when focussed;

Figure 5 is a side elevation of the camera on a larger scale, in section on line 5—5 of Figure 3, when arranged to work with flexible films; but the section is only through the woodwork, and the parts which protrude through 9 in Figure 3 are assumed to be not cut away in Figure 5;

Figure 6 is a similar elevation in section on the line 6—6 of Figure 3;

Figure 8:
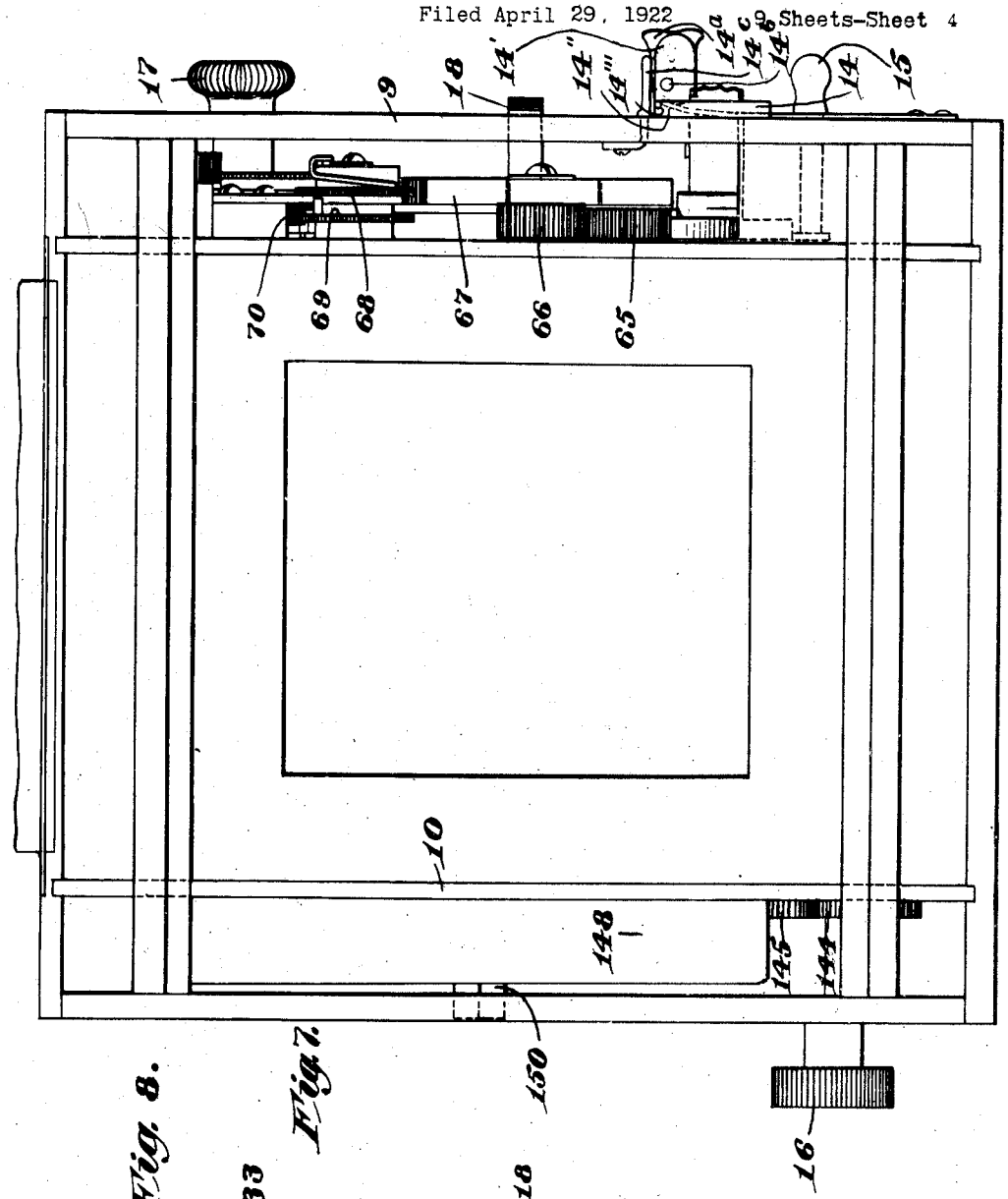
Figure 8 is a rear elevation of a fragment on the line 8—8 of Figure 5, showing the diaphragm setting device.
Figure 7:
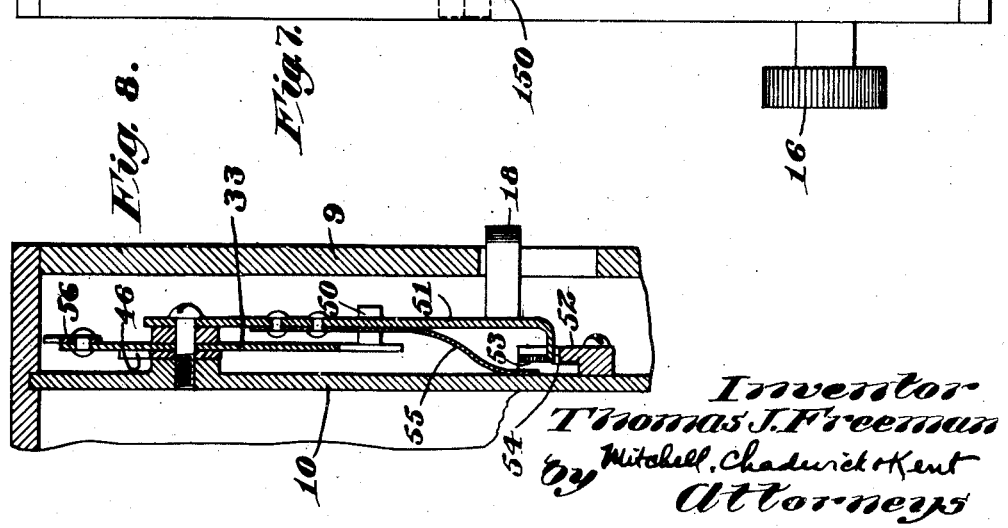
Figure 7 is a rear elevation on the enlarged scale, in section on the line 7—7 of Figure 5, which is in the plane of the sensitive film; thus practically representing the camera with film or plate holder removed.
Figure 10:
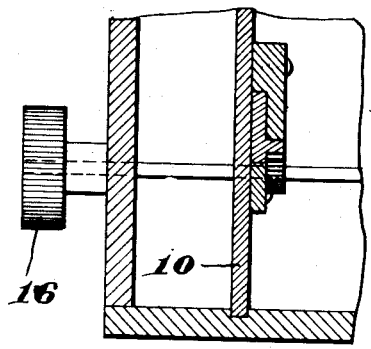
Figure 11:
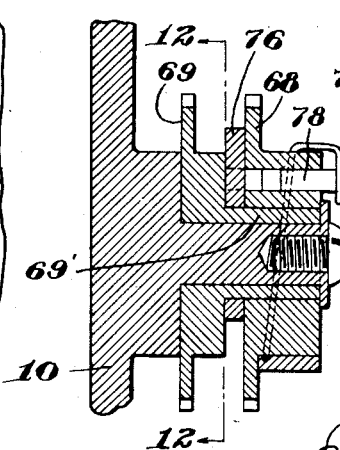
Figure 12:
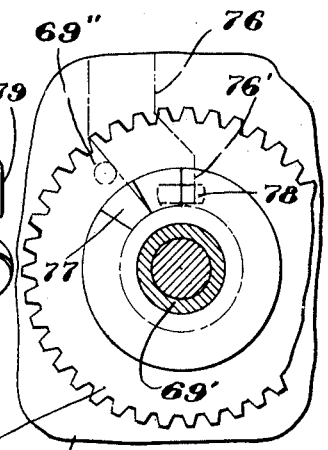
Figure 14:
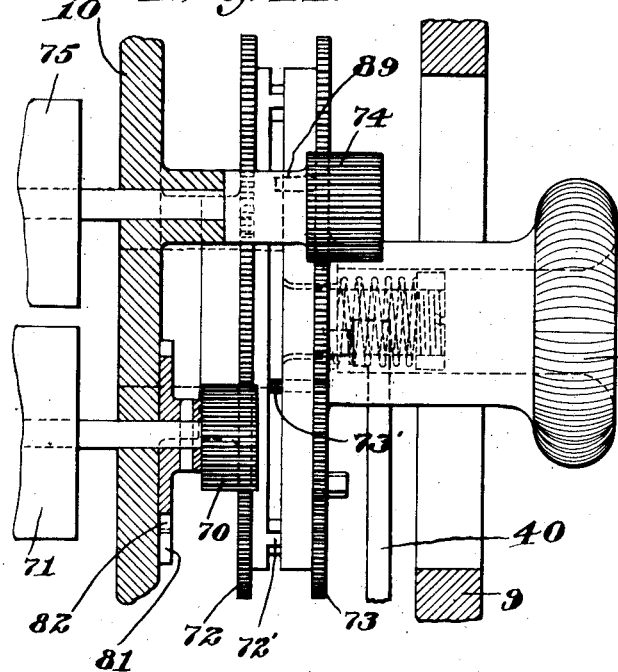
Figure 13:
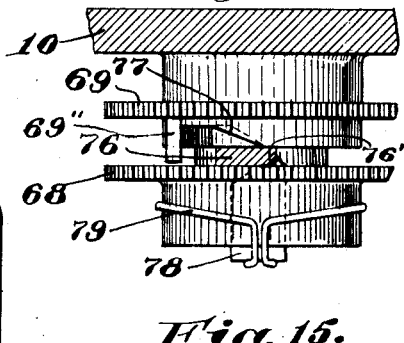
Figure 15:
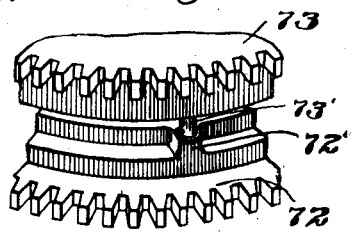

Figure 8ª is a rear elevation of another fragment, on an enlarged scale, in section on the line 8ª—8ª of Figure 5, showing the power clutch;

Figure 9 is a rear elevation in section on the line 9—9 of Figure 5, showing the film feeding devices;

Figure 10 is a rear elevation of a detail in section on the line 10—10 of Figure 6, being the focussing device;

Figure 11 is a rear elevation in medial section through a part, greatly enlarged, of the shutter setting and operating mechanism, on line 11—11 of Figure 16;

Figure 12 is a side elevation of the same, in section on line 12—12 of Figure 11;

Figure 13 is a plan of the same;

Figure 14 is a rear elevation, in medial section through another part of the same, being in the plane of the shutter carrying spools, on line 14—14 of Figure 16;

Figure 15 is a perspective, showing details that are illustrated in Figure 14, but with the parts set for making a "time" exposure;

Figure 16 is a side elevation of parts of the operating mechanism, with outside wall removed to the same plane as in Figure 5, but on a larger scale and showing more details;

Figure 17 shows the left side of the camera, in elevation, in section on the line 17—17 of Figure 3, enlarged;

Figure 18 is an elevation, looking at the right side of the camera, showing arrangements for storing plates and feeding them automatically to the focal plane for exposure;

Figure 19 is a similar elevation in medial section, somewhat diagrammatic;

Figure 20 is a perspective, on a much enlarged scale, illustrating details of the means for holding and moving sensitive plates;

Figure 21 is a plan, looking upward, as from the line 21—21 of Figure 18, showing details of the driving mechanism for the plate shifting;

Figure 22 is an elevation of the same details seen from the right hand side of the camera, as on a section made on line 22—22 of Figure 21, and Figure 23 is a perspective of a plate holding septum.

In the drawings, which are more or less diagrammatic, the very complete extent to which the camera is automatic is indicated in Figures 1, 2 and 3, where it is seen that the only mechanisms of the camera having parts visible to the operator are those which require the exercise of human judgment or power, viz: the shutter setting knob 17 for predetermination of the duration of exposure; the diaphragm control 18 for predetermination of its focal ratio; the release button 15 for making exposure; the power lever 14 or the clutch 151 for resetting all parts ready for a succeeding exposure. These are assembled on the right hand side of the camera, which is the only side to which the operator ever has need to look, when about his work. The diaphragm 20 on the front requires no attention; nor do the films or plates in the holder 11 at the rear; and the focussing knob 16, on the left, is naturally operated without looking at it.

The light-tight camera box carries the greater part of the operating mechanism on the outer side of its walls 10, that which is on the right hand side of the camera (which herein signifies that side which is at the operator's right when the camera is in position for use) being covered by a guard board 9 which permits a user to handle the camera without seeing or knowing anything about the mechanism except those few parts above mentioned, which are on the outside of the guard plate 9 or are visible through openings therein. Within the box 10 are the mirror 60 (Figure 6) and the focal plane shutters 99. The mirror swings 45° on shaft 37 (located, for clearness, lower than is preferable), between its full line and dotted line positions. The flexible sensitive film 100 is in the removable rear box 11; or sensitive plates 200 may be used, in the corresponding removable box 11ª (Figures 18, 19). Figures 1, 2, 5-16 show the invention as it may be applied for shifting a flexible carrier film automatically; while Figures 18-23 show alternative apparatus for holding glass plates and shifting them automatically to the exposure plane, in sucession, without attention of the operator. The box walls 10 also hold the customary lens 12 of any suitable sort; the ground glass screen 62 in the top; and the optical hood 13 for the operator to view the screen.

Principal elements of the mechanism are seen in Figure 5, which shows the connection of both the hand power lever 14 and the spring power lever 140 through a clutch 151 (Figure 8ª) and linkage to the shaft 37 which swings the mirror; through further linkage to the diaphragm 20, (Figure 3) in lens tube 22; and through gear 68 to the shutter winding mechanism 70, 74; and to the film changing mechanism 112 (Figure 5) or plate changing mechanism 211 (Figures 18, 22).

The diaphragm 20 is represented as of the iris type, adapted to be actuated by rotation of a casing 21 on the lens tube 22. Within the casing is a spiral spring 19, like a clock spring, which tends to rotate the casing so as to close the diaphragm, while on the outside of the casing is a flexible wire 23 wound upon a part of its surface as on a drum, leading from a hook 24 thereon to the end of a horizontal lever 25 below the lens. This lever lies across the face of the lens board, being pivoted at 26 on a plate 27 which is fast on the movable front wall 8 of the camera, herein for brevity called the lens board. The downward pull of this lever on the wire 23 rotates the casing 21 and opens the diaphragm, winding the spring 19. In order to be thus pulled, the end of this lever at the right side of the camera is connected by a pin 28, whose axis runs fore and aft, with a short vertical link 29 whose upper end has a pin 30, with axis running transversely, affording connection with a system of linkage, (31, 57, 56, 33, 35, 36, 38) the function of which is to transmit a downward swing of the power lever 14 to the link 29, as an upward pull on pin 28 thereby to pull down the wire 23 and open the diaphragm, with smoothness and facility, regardless of however much the lens board may happen to be extended from the camera body for focussing, as for example in Figure 4. In this system of linkage the lever 31 carries the said pin 30, and is fulcrumed on the same bracket 27 which supports lever 25, mounted on the lens board. To swing the lever 31 upward through a short vertical arc there is a link 57, which is pulled upward by bell crank 45 whenever the latter is pulled by link 56 and lever 33, both bell crank and lever 33 being pivoted on the exterior wall of the camera box 10 and covered by guard board 9. The fulcrum of lever 33 is at 34, and the lever 33 is swung about said fulcrum by the pull of a link 35 by a lever 36 that may be pulled downward about its fulcrum 37 by a link 38 attached at 39 to the plate lever 65, and thus to the power lever 14; so that when the operator swings the power lever 14 downward he pulls down the lever 36, incidentally turning down the mirror 60 which is fast on its fulcrum shaft 37, and so swings the lever 33 counter-clockwise, opening wide the diaphragm 20. The same movement may be executed by the power swing of lever 140 to the rear, as later herein more fully explained. To hold the diaphragm thus open, a latch is provided consisting of a long curved lever 40, at whose exposed lower tip is the operating or release button 15. This latch is pivoted at 41, above which pivot it has a notch and abutment 42 that is adapted to catch and hold the end 43 of lever 36 when the latter is drawn down far enough to correspond to the full opening of the diaphragm. A weak spring 44 is sufficient to make this latch engage whenever opportunity offers, provided the operator has let go the button 15, and to hold it so until the operator depresses the releasing button 15.

The bell-crank 45 is pivotally supported at 48 at the junction of two links 46 and 47 which together extend beside the bellows between the fixed camera wall 10 and the movable lens board 8. This bell-crank is always ready to transmit a pull from lever 33 to 31, through the links 56 and 57, which remain always parallel to 46 and 47 respectively, however the lens board is moved out or in, in focussing. The operating of the diaphragm from a fixed position on the side of the camera is thus unaffected by movement of the lens board.

To predetermine the position at which the diaphragm will be automatically set when an exposure is made, the lever 33 has a depending limb with a projecting lug or pin 50 which, during the swing of lever 33, when the diaphragm is closing, engages an adjustable stop bar 51 which is pivoted at the fulcrum 34 of lever 33 and can be locked in any of a considerable number of positions at the choice of the operator. For the operator's guidance a scale 52 is marked, visible from the outside of the camera box (Figures 1 and 8) indicating the focal ratio which the diaphragm opening has when the projection 50 is against the bar, and the bar is at the various points on the scale. Said bar 51 may be anchored by any suitable means, the means here portrayed being a rack 53 on the back side of the scale bar 52, combined with a tooth 54 on the end of bar 51, adapted to engage in any part of the rack and normally forced toward such engagement by a spring 55. To set the bar 51 the operator pushes the finger piece 18 toward the camera box, to the left in Figure 8, thereby flattening the spring 55 and bending the spring bar 51 a little, whereupon he can swing the bar 51 (to or from the eye in Figure 8, being to right or left in Figures 1 and 5) so as to set it where it stands ready to arrest the pin 50 and lever 33 with the diaphragm 20 in desired focal ratio. This it will do whenever said lever 33 swings from its full open position (dotted in Figure 5) upon the release of the latch 42 by button 15. It will be understood that on such occasion the spring 19 closes the diaphragm until thus stopped.

Simultaneously with the closing of the diaphragm, which is released by button 15 and linked with the swing of lever 33, occurs the rotaton of shaft 37 and complete up-swing of the mirror 60 (Figure 6) which are also released by the disengagement of the same lever 36 whose release allows link 35 to rise, thus letting lever 33 move. But this link 35 and lever 33 have a pin and slot connection, so that the movement of the link and therefore the swinging of the lever 36 and the mirror 60 can continue to the extreme limit of the mirror's travel, drawn by the spring 61, notwithstanding that the swing of the lever 33 may be stopped by the diaphragm stop bar 51 as above explained. There should be sufficient length in the said slot to provide the necessary lost motion for a complete swing of the mirror when the lever 33 does not move at all, as in cases where it is desired to make an exposure with the full diaphragm opening.

Figures 5 and 6 show the parts in the position which they occupy when an exposure has just been made, the diaphragm being then closed to the predetermined extent, the mirror swung up, the shutter run down, and the film ready to be changed. The resetting of all parts is accomplished instantly and automatically by a power spring on the left side of the camera (Figure 17) acting through shaft 143, crank 142, connecting rod 141 and spring power lever 140, as later described; or these spring power parts can be omitted, in which case the resetting is accomplished by an extreme downward swing followed by an extreme upward swing of hand lever 14, effected by the operator. This latter will be first described. The hand power lever is mounted outside of the guard board 9 on the hub shaft 64, and has a finger rest 14' by which it may be depressed. There is also a latch 14'' for holding it up at extreme height, for a reason to be mentioned in connection with the shutter winding. Said latch 14'' (Figure 7) consists of a spring which snaps under a ledge 14''' on its rear face. There is means for automatically displacing this latch whenever the operator wishes to use the lever, consisting of a dog 14$^a$ loose in the finger piece of the lever 41, rising a little above it so as to be the first part engaged when the operator presses thereon with his finger, and pivoted inward at 14$^b$ so that the operator's finger naturally swings the outer part of this dog downward. The inner end of this dog is so shaped as to press the latch 14'' and thus to unlatch it. In consequence, when the operator presses down on the finger piece of the power lever 14 his finger first operates its unlatching dog 14$^a$ and then depresses the power lever 14. The situation of this lever on the right hand side of the camera is such that this movement can conveniently be effected by the operator engaging the forefinger of his hand under the bottom of the box and drawing the lever down toward it with his thumb; immediately after which, transferring his thumb to a fixed finger rest 14$^c$ just above, he draws the lever up to its extreme height by a similar compression between his thumb and forefinger, whereupon the latch 14'' engages and holds everything ready for the next exposure.

However, in the completely automatic camera the hand power lever 14 is not used, the lever 140 taking its place, in function, and moving with a stroke to the left in Figure 5 and thence back to the position illustrated whenever it is thus driven by the connecting rod 141 which is operated by the crank pin 142 on the shaft 143, which is driven through a chain of gears 144, 145 and 146 (Figure 17) on the left side of the camera. These gears in turn are driven, whenever the lever 140 is free to move, by a sufficiently strong coil spring indicated at 147 which is secured within a casing 148 that is mounted rotatably on the exterior of the camera box. This can be wound by a removable handle 149 which fits on the squared end of shaft 150 of the casing.

Any suitable clutch may be provided so that the sector 65 is driven either by the hand lever 14 alone, or the power lever 140 alone, or by both coupled together. For this purpose Figure 8$^a$ illustrates a clutch that may be used, wherein a knob 151 is exposed conveniently on the right side of the camera with a pointer 152 for convenience of the operator by showing how the clutch is set, the knob being fast on a multi-threaded screw 153. By a turn of the knob the key 154, sliding in a groove 155 in the prolonged hub 64 of the sector plate 65 connects said sector either with the hand lever 14 or with the power lever 140; or, if the key be long enough, as is illustrated, it may be connected with both of them at the same time. A lock, resembling a sliding bolt, may be provided as at 157 (Figure 5) to engage the disc of the crank pin 142 and thus hold the power spring in check whenever the power spring is not connected through the clutch 154 with the sector 65. When the power spring is thus connected with the sector 65 it is held in check by a spring latch 158 which is released by a cam 159, as later herein described, whenever the shutter has been operated. Figure 5 illustrates the instant when the shutter has been operated and the cam has released the latch; and the power lever 140 is about to start on its stroke which comprises one complete reciprocation, until the crank pin 142 returns to its illustrated position where the parts are again latched by the spring latch 158 ready for the next exposure.

The connections to the mechanism operated by the power levers will now be described. The hub 64, to which either lever may be connected by the clutch, is rigid with a gear sector 65 that winds the shutter, removes the exposed film or plate and brings a new one into position, and which also carries the pin 39 that operates the mirror and diaphragm mechanism already described. The mirror is set and the diaphragm opened by the initial power stroke, acting through link 38; but both become then latched at 42, at the end of said stroke. The link 38 contains a slot which permits it to leave the lever 36 thus latched down and immediately to rise idly on the return stroke.

The train of gearing which operates the shutter is marked 65, 66, 67, 68, 69 and 70 (all seen in Figure 5, except 69 which is directly behind 68). The gear 70 is on the shaft which carries the under spool 71 of the two shutter winding spools 71, 75, at the top of the camera (Figures 14, 6). The train to the upper spool 75 is: gears 70, 72 (Figure 14); 73 (on the same axis with 72, of identical size, and concealing it in Figure 5); and 74 (on the shaft of 75).

The connection between gears 68 and 69, which are on the same axis, side by side, of equal size, is such as to permit gear 68 to turn without gear 69, except when they are coupled together by a clutch. Details of a suitable form of clutch are seen in Figures 11, 12 and 13. This clutch is a pawl 78 mounted on the gear 68 and adapted to engage and rotate the gear 69 for winding it, anti-clockwise in Figures 5, 12 and 16, but to run back freely and disconnected from it in the other direction. The gear 69 has a long hub 69' which passes through a stationary bar 76 suitably supported on the camera box, which at one edge (the right in Figure 13) constitutes a cam 76', and at its other edge (the left in Figure 13) constitutes a stop for the unwinding movement of gear 69. Beyond this, on the hub 69' of gear 69, is gear 68 (Figure 11). When the shutter is run down, the gear 69 occupies the position shown in Figures 12 and 13 with its recess 77 at the left of the top, with its stop pin 69" against the stop bar 76, where it is held by the tension of the shutter spring in the spool 71' at the bottom. The position of the gear 68 and its pawl 78 depend upon the position of the gear sector 65 with which this gear is permanently in mesh, and the power lever that actuates it. When the operator moves the lever 14 downward, gear 68 rotates clockwise from its position illustrated in Figures 11, 12, 13 and 16 until when said lever 14 has reached the lower limit of its stroke the pawl 78 is opposite the recess 77 position in Figure 13, whereupon the spring 79 presses it into said recess to engage the gears 68 and 69 together. When the operator swings the power lever 14 upward, this rotates gear 68 anti-clockwise, carrying with it gear 69, and thus winding the shutter on spools 71 and 75 simultaneously at equal speed, until nearly a revolution of gear 68 has occurred, when the leading face of the pawl encounters that edge of the bar 76 which is to the right in Figures 12 and 13, which has a rounded corner arranged as a cam face 76' to throw the pawl out from the recess 77. The gears 68 and 69 are thus disengaged; but the shutter, which has been wound against the tension of the springs within the lower shutter spools 71' 75' (Figure 6) is held wound by a pawl 81 which engages in a ratchet wheel 82 on the shaft of gear 70, thereby locking both shutter spools. This pawl 81 will be released only when its tail is hit by the lever 36, (Figures 5 and 16) at the end of the upward swing of that lever, at which time the mirror 60 has reached its full line position of Figure 6 and the way is clear for the making of the exposure, as is ordinary in reflex cameras. Thus the initial and return swing of the sector 65, actuated by either power lever 14 or 140, has caused the gear 68 to reach around to the run down position of the shutter winding gear 69, engage it, and return it to the wound position ready for another exposure; and the power lever latches 14" (Figure 7) and 158 (Figure 5) prevent accidental slight recession of gear 68 with its pawl 78.

The exposure is made by the passage of an opening in the shutter 99 down across the face of the sensitive film 100 in ordinary manner, the shutter being composed of two curtains which move simultaneously, each having an opening, and the length of exposure depending upon the degree to which these openings are preliminarily fixed overlapping each other. As this is well known it is not illustrated; but the means for varying the degree of overlapping while also providing for automatic operation is an important feature and is illustrated in Figures 14 and 16. This consists in the provision of means to wind or unwind the spool 75 to a degree, without at the same time moving spool 71. It is accomplished by pulling out the knurled knob 17 on gear 73, thereby splitting the gear 73 away from the similar gear 72 on the same axis, until the pin 89 which projects from 73 into 72 is withdrawn; then rotating the knob 17 and gear 73, thereby turning in either direction the gear 74 and spool 75, until the desired degree of overlapping of openings in the two parts of the shutter is obtained; and then releasing the knob with the pin 89 entering the proper hole in 72 to hold the gears in this desired relation. Such degree is ascertained by indications 86 marked on the side of gear 72, as viewed through an opening 87 in gear 73 (Figure 16), there being an opening 88 in the guard board 9 so that these parts can be seen from the outside. The said holes in gear 72 are seen in dotted lines at the top of Figure 16, and the pin 89 is distinguished from the holes by the device of representing it in full line, it being remembered, however, that actually it is not in view but is on the rear side of gear 73.

To make it possible to use the camera for time exposures, short leg lugs 73' are employed, projecting from the gear 73 toward the gear 72 and adapted to rest in elevated sockets 72' and when so resting, to maintain the gears 72 and 73 in parallelism, with the pin 89 not quite reaching the gear 72. These pedestal sockets 72' and the lugs 73' that fit therein are so set on their respective gears that when they register together the two curtains which together constitute the shutter are spread apart far enough to make an opening as large as the full face of the film that is to be exposed. The outside of the gear 73 has certain lugs 91, 92 and 93 which are adapted to co-act with the tip end of the lever 40 which is provided with a lug 40' offset toward the gear 73 so as to engage one or the other of said lugs 91, 92, 93 according to the position occupied by the lever 40. The opening of the shutter having been arranged for time and the shutter wound, the pressing of the release button 15 allows the shutter to run down until the lug 91 encounters the end of lever 40, which is in line to receive it when the release button 15 is pressed. This lug is so located that the full aperture of the shutter is over the sensitive film. The exposure can then continue as long as the operator keeps his finger on the release button 15; and it ceases when he removes his finger because the spring of the lever 40 then throws the lug 40' out of line and allows the shutter to continue its closing movement.

The lug 92 is set on the same radius as the lug 91 and can be used if it be desired to wind the shutter from its run down position to the half wound and fully opened position by turning knob 17 by hand, in which case the lever 40 will hold the shutter in this open position. If it be desired to fully wind the shutter, without the mirror being swung down, the hand winding by knob 17 may be continued until the lug 93, which is a proper distance further around on gear 73, snaps past the lug 40' on the lever, whereupon the shutter is held fully wound, without the mirror having been let down and ready for the making of an exposure upon the touching of the release button 15. The initial movement of the lever 40 then slips the lug 40' from under the lug 93, letting the shutter start, and the lug 40' reaches its extreme outward position under lug 91 before that lug arrives, with the result that the shutter is caught wide open and may be held as long as desired by keeping the release button depressed. These features make the camera available for all uses in spite of the automatic equipment for which it is primarily designed.

The running down of the shutter constitutes the key or automatic initiative of the re-winding, the film changing and the mirror and diaphragm setting. This is accomplished by providing a pinion on one of the lower shutter spools 71' which meshes with a pinion, carrying the cam 159, of such circumference that when the said spool is in the position corresponding to the completely run down limit of the shutter the cam 159 is in the illustrated position (Figure 5) in which it is pushing the spring latch 158 away from the power lever 140, while when the shutter is completely wound up the cam 159 has revolved only something less than a complete revolution, not far enough to reach and open said latch. This provides a safeguard which limits the operation of the power spring to one single reciprocating stroke of the power lever 140.

A safety device, which is of value in case the operator should leave his finger too long on the release button 15, and thus hold the lever 40 out beyond the time when it should be back in position to catch the lever 36 on its down swing, is shown in Figures 5 and 16. A dog 42$^a$ pivoted on lever 40 at 42$^b$ has a notch and abutment 42$^c$ registering with the notch and abutment 42 of lever 40, pushed in the same direction as lever 40 by spring 42$^d$ and stopped in registry therewith by a latch 42$^e$ which is adapted to engage the upper end of this dog 42$^a$ and which is spring pressed into engaging position. Said latch is pivoted on the lever 40. When the operator presses the release button 15 and the lever 40 thus swings to the right in Figure 16 the dog 42$^a$ and its latch 42$^e$ swing with it until the cam face of the latch engages a fixed pin 42$^f$, after the lever 40 has swung far enough to do its work of releasing the mechanism 36 and before it has reached the end of this throw. In the last stage of movement of the lever 40 this pin 42$^f$ lifts the latch 42$^e$ and thereby allows spring 42$^d$ to push the dog and its notch, 42$^a$ 42$^c$ back to the left into position to receive and engage the lever 36 when it next swings down, even though the main lever 40 be still held to the right because the operator has kept his finger too long on the release button 15.

The mechanism for changing a flexible film, to substitute a fresh film for an exposed film, is seen in Figures 5, 6, 9 and is in the film holder 11. The unexposed film is mounted on a spool 101 at the bottom of the film holder, suitably arranged so that a fresh spool can be substituted, on centers having provision as at 102 for friction of the spool heads against rods 102' to prevent the unrolling of the spool except when the film is drawn. This film is guided through the plane of exposure by rollers 103, 104, respectively at the bottom and top; and it is looped under a feed roller 104' to the draft spool 105 at the top, which spool is mounted so as to be removable, is driven through friction means 106, and through mounting means provided with a ratchet and pawl 106' to hold it positively against being unwound. There is means consisting of gear 110 and pawl 116' to rotate it in the direction of wind film. Said gear is driven by a gear 111 which meshes with the gear 68 on the body portion of the camera. The gear 111 is on a shaft with sprocket wheel 112 from which the sprocket chain 113 runs down to the idler sprocket 114. The feed roll 104 is on an axle extending across to a similar sprocket chain on the left of the camera, so as to move with the rear part of the chain, down and up, a short distance in each direction. In operation, the initial stroke of power lever 14 or 140 rotates gear 68 clockwise, as already explained, and this through gear 111 draws down rear part of chain 113, carrying down the feed roller 104 and thus lengthening the bight of film 100'. On account of the pawl 106' the previously exposed film on spool 105 cannot unwind; and hence the recent exposure is drawn fully away from the focal plane into the bight, and a precisely measured length is drawn from the supply 101. On the return stroke of the power lever the gear 68 rotating anti-clockwise draws up the rear part of chain 113, raising feed roller 104. Simultaneously, as it rotates gear 110, it drives gear 116 through pawl 116', in direction to wind film on the spool 105. The gearing may be in such ratio that this draft will be sufficient to absorb all that was drawn into the bight 100', even though the diameter of the roll of film on 105 be small; and the frictional resistances should be arranged to have the pull at 106 strong enough to draw the film tight in the focal plane, and yet to slip before any slippage occurs at the supply roll 102.

Thus the initial stroke of the power lever replaces the exposed by a fresh film while the shutter remains closed, swings down the mirror and opens the diaphragm; the upward swing immediately following winds film on the roll of exposed film and resets the shutter, the film being meanwhile protected by the mirror being in its down position; so that all is ready for the making of a fresh exposure upon the operator's pressing release button 15.

The automatic camera of the invention is moreover capable of doing the higher grade work which is characteristic of the use of glass plates instead of flexible films for carrying the sensitive film. For this, reference is made to Figures 18–23, showing a plate holder 11ª which may be substituted for the film holder 11 at the rear of the camera box 10. This is adapted to hold a sensitized plate 200 in the same plane as that in which the sensitized film 100 is held by the film holder; and the operation of the main part of the camera with respect to it is the same as has already been herein described; but this part of the invention provides means for automatically substituting a fresh plate for one that has been exposed. The main features of this are the provision of a magazine 201 which holds a pack of metallic septa 202 each of which contains a sensitive plate and is adapted to be shifted about within the holder as herein described; means constantly pressing the pack toward the exposure plane; and means which, after an exposure, slips the forward septum of the pack edgewise off from the pack, carries it back past the pack and adds it to the rear of the pack; and mechanism for accomplishing this whereby the reciprocating stroke of either power lever 14, 140, is converted into continuous movement of the plate-moving mechanism.

The plate holder 11ª has a box of suitable size for holding the pack of plates, of which twenty-seven are illustrated in capacity at 201 in Figure 19, there being an entrance to the magazine from the rear by the removable slide 203 through which plates may be inserted and removed. This slide carries a flat bow spring 204 which tends always to push the pack forward in the camera and whose curve, approaching the back of the pack for tangential contact therewith is of such a gentle angle that a plate can easily be slid edgewise between the spring and the pack. The plates are individually housed in septa each of which is a sheet of thin metal bent so as to cover the back of the plate, enclose its top and bottom edges, cover its vertical edge which is in the lead when inserted, and leave free its other vertical edge, of the general shape illustrated in Figure 23. This leaves the sensitive face of the plate exposed and yet protects the plate from rubbing during the mechanical handling about to be described. At the bottom of each septum is a rod 205 whose tips extend a short distance, say three-sixteenths of an inch, beyond each end of the septum. The width of the magazine, being the dimension to and from the eye in Figure 19, is such that the septum with its contained plate fits nicely so that the pack can move easily from left to right in Figure 19, which is from the rear forward in the camera with each end of the rod 205 projecting through a slot 206 in the side wall 218 of the magazine, and projecting far enough through to be engaged by a hook 207 on a chain 208 which travels along this slot close to the outside of the magazine side wall, there being one such slot and chain at each side of the plate holder. The shape of the slot is seen in Figures 18 and 19, starting at the right hand lower corner of the magazine as there portrayed and extending vertically upward and thence turning through a half-circle to the rear and extending vertically downward to the bottom of the magazine, thence horizontally forward to the point of beginning. Each chain makes a complete circuit over sprocket wheels at top and bottom for each complete reciprocation of either power lever 14 or 140. In so moving, its hook 207, details of which are seen greatly enlarged in Figure 20, and an intermediate position of which is illustrated by the dot and dash lines in Figure 19, comes upward on the right in Figure 19 and engages the leading one of the rods 205 at one end of that rod, while the corresponding chain and hook at the other side of the plate holder engage the other end of said rod. Moving in unison these hooks carry said rod upward, sliding the septum with its contained plate in advance to the position illustrated at the top in Figure 19 and thence carry it downward until the rod reaches the level of the other rods 205 at the rear of the pack. While being pushed up the plate enters a pocket 210 which is wedge shape as illustrated in Figures 18 and 19 and which both keeps the plate in the dark and guides its upper edge so that it remains approximately upright. The top sprocket wheel 220 has a tooth 223 which registers always with the hook 207 so as to overlie the hook just in advance of it and make a third side to the pocket in which the end of rod 205 is being conveyed, thus holding said rod in said pocket when the hook has become inverted and is moving downward in the rear portion of the slot, so far as the line of the sprocket wheel follows the line of the slot. But this tooth being on the sprocket wheel withdraws itself from the chain where its path diverges from that of the chain; and this leaves the rod 205 free to escape from the hook 207 on the side of that hook which is shown open in Figure 20, that is, to the left in that figure, which is to the right when the hook has been inverted and has moved down along the slot at the left of Figure 19. In this move down the septum presses back the spring 204 and gradually is inserted edgewise between it and the pack, under pressure of the spring, until its rod 205 closely approaches the bottom of the slot at which place the slot turns and proceeds horizontally to the right in Figure 19 to the place of beginning. When the rod reaches the horizontal part of the slot, the horizontal pressure of spring 204 pushes it into that horizontal part of the slot, while the hook 207 continues around the lower sprocket wheel 221. To facilitate this separation of the rod 205 from the hook 207 the corner turned by the slot is cut away on an angle at 206' the angle being such as to act as a cam for continuing the downward movement of the rod for the last necessary bit, after it has left the hook, to get it fully into line with the others. In going through this course from start to finish the rod at the bottom of an exposed plate turns in the hook 207, the face of the plate always remaining forward in the camera. The plate which was behind it is pushed forward into the focal plane as soon as the space is clear by the removal of the exposed plate; and full tension of the spring in holding the whole pack forward is restored as soon as the exposed plate has moved down into the rear of the pack.

The power for driving the sprocket wheel 220 comes through a gear 211 in the plate holder, which slips into mesh with gear 68 in the camera when the plate holder is attached thereto. The gear 211 meshes with a gear of equal size 213 which consequently rotates oppositely; and each of these gears has a ratchet on its hub, respectively 211' and 213', adapted to drive a pawl when the ratchet rotates anti-clockwise. The pawl driven by ratchet 211' is marked 214, that driven by 213' is marked 215. Pawl 214 is mounted on gear 212 and consequently rotates that gear anti-clockwise whenever the gear 211 turns anti-clockwise, and does not affect it when gear 211 turns clockwise. Said gear 212 is loose on the same shaft on which gear 211 is loose, and it meshes with an idler 216 which meshes with gear 217 which is rigid on the same shaft 219 on which the sprocket wheel 220 is also rigid. This gear 217 carries the pawl 215 which is driven by the ratchet 213' (which is loose on the same shaft 219) whenever the gear 213 rotates anti-clockwise. Consequently the reciprocating movement of the connecting gear 68, resulting from the power lever 14 or 140, drives gear 217 and sprocket wheel 220 continuously in the same direction. Its initial clockwise turn operates through gear 211, ratchet 211', pawl 214 and gears 216, 217 to turn the latter anti-clockwise, while pawl 215 slips over its ratchet 213; and its return clockwise swing operates through gears 211, 213, ratchet 213' and pawl 215 to turn gear 217 anti-clockwise while the ratchet 211' slips past its pawl.

It will be understood that any other suitable mechanism for shifting films or plates may be used, and in general, the gear 68 is so located to be available for transmitting power to such mechanism.

I claim as my invention:

1. In a camera, the combination, with a film magazine, means to hold film for exposure, a shutter, and a receiver for exposed film, of film shifting means; a variable diaphragm; a movable finding mirror intervening; a manually operated part and connections therefrom to the film shifting means, diaphragm and mirror whereby the operator applies power through a single element to shift film for fresh exposure, open diaphragm for finding, and set mirror for finding; means whereby the diaphragm and the mirror are temporarily secured as set; and single releasing means for the diaphragm, mirror and shutter.

2. The combination, in a camera, of film holder and film shifting means; a shutter and reciprocating power-applying and connecting mechanism for simultaneously setting said shutter and actuating the film shifting means comprising a train of movable elements, wherein a stroke in one direction is associated with movement of the film from the place of exposure and with reaching to engage the unset shutter, and stroke in the opposite direction is associated with winding moved film and setting the shutter.

3. The combination, in a camera, with film holder and film shifting means, of a finding mirror and a diaphragm having variable opening for finding, a reciprocating actuating mechanism therefor, comprising a power applying device and connections therefrom to the said film shifting means, mirror and diaphragm, wherein on one stroke the setting of the finding mechanism, including the movement of the mirror into film protecting position while the shutter remains closed, are associated with the movement of the film from its place of exposure, and on the other stroke the moved film is stored, there being lost motion in the connections between the power applying device and the said mirror and diaphragm whereby the mirror and diaphragm remain set as at the end of first stroke.

4. In a camera, the combination, with a focal plane shutter and finding mirror, and a variable diaphragm, of a single lever and one-way connections thence to the shutter, mirror and diaphragm whereby the lever's stroke in one direction sets the diaphragm and mirror in finding position, and has lost motion with respect to the shutter; and whereby the lever's stroke in the other direction sets the shutter and has lost motion in respect to the mirror and diaphragm.

5. In a camera, the combination, with shutter, finding mirror and a variable diaphragm, of a power arm connected to and arranged for setting the shutter, mirror and diaphragm in position for exposure; and means whereby said power arm is disconnected from the shutter and mirror when the power arm is in position at the end of its said setting stroke.

6. In a camera, the combination, with shutter, finding mirror, and a variable diaphragm, of a power arm connected to and arranged for setting the shutter, mirror and diaphragm in position for exposure; and means whereby said power arm is disconnected from the mirror when it is set.

7. In a camera, the combination, with shutter, finding mirror, and a variable diaphragm, of a power arm connected to and arranged for setting the shutter, mirror and diaphragm in position for exposure; and means whereby said power arm is disconnected from both shutter and mirror when both have been set.

8. In a camera, the combination, with a shutter, finding mirror, variable diaphragm, film shifter; and interconnected actuating mechanism for them all; of a single lever engaged with said mechanism whereby power is applied for actuating them all.

9. In a camera, the combination, with a shutter, finding mirror, variable diaphragm, and film shifter of interconnected actuating mechanism engaging with said shutter, mirror, diaphragm and film shifter and arranged for actuating them all in an order which is predetermined by said mechanism.

10. In a camera, the combination, with a focal-plane shutter and a finding mirror, of interconnected mechanism comprising linkage to operate the mirror, gearing to wind the shutter, and a gear actuating both said linkage and gearing; and means for applying reciprocating power thereto; the gear having a one-way clutch for the shutter and the linkage having a lost motion connection to the mirror.

11. In a camera, the combination, with a finding mirror, of a variable diaphragm, and power means for setting them both, arranged on the side of the camera; there being a parallel motion linkage extending therefrom to the lens board and there connected with the diaphragm; and an adjustable stop for said diaphragm linkage with an indicator on the same side of the camera; and lost motion devices in the connections whereby the power mechanism makes a full stroke for setting the mirror and diaphragm, and a full stroke for permitting removal of the mirror coupled with a partial closure of the diaphragm.

12. In a camera, the combination, with a focal plane shutter, finding mirror, a variable diaphragm, and film shifting means, of interconnected mechanism for setting them all; a spring, storing power, for a multiplicity of cycles thereof; and releasing means for permitting the spring to set them in operation, arranged to be operated manually.

13. In a camera, the combination, with a focal plane shutter, finding mirror, a variable diaphragm, and film shifting means, of interconnected mechanism for setting them all; a spring, storing power, for a multiplicity of cycles thereof; and releasing means for permitting the spring to set them in operation, said releasing means being in two parts, the first releasing the shutter for exposure under secondarily stored power, and the second arranged to be automatically actuated upon the running down of the shutter and releasing the primary storage power to re-set the parts.

Signed at Boston, Massachusetts, this third day of February, 1922.

THOMAS J. FREEMAN.